(No Model.) 4 Sheets—Sheet 2.
O. C. ZIMMERMAN & C. H. PORTER.
GRAIN THRASHER AND SEPARATOR.
No. 531,823. Patented Jan. 1, 1895.
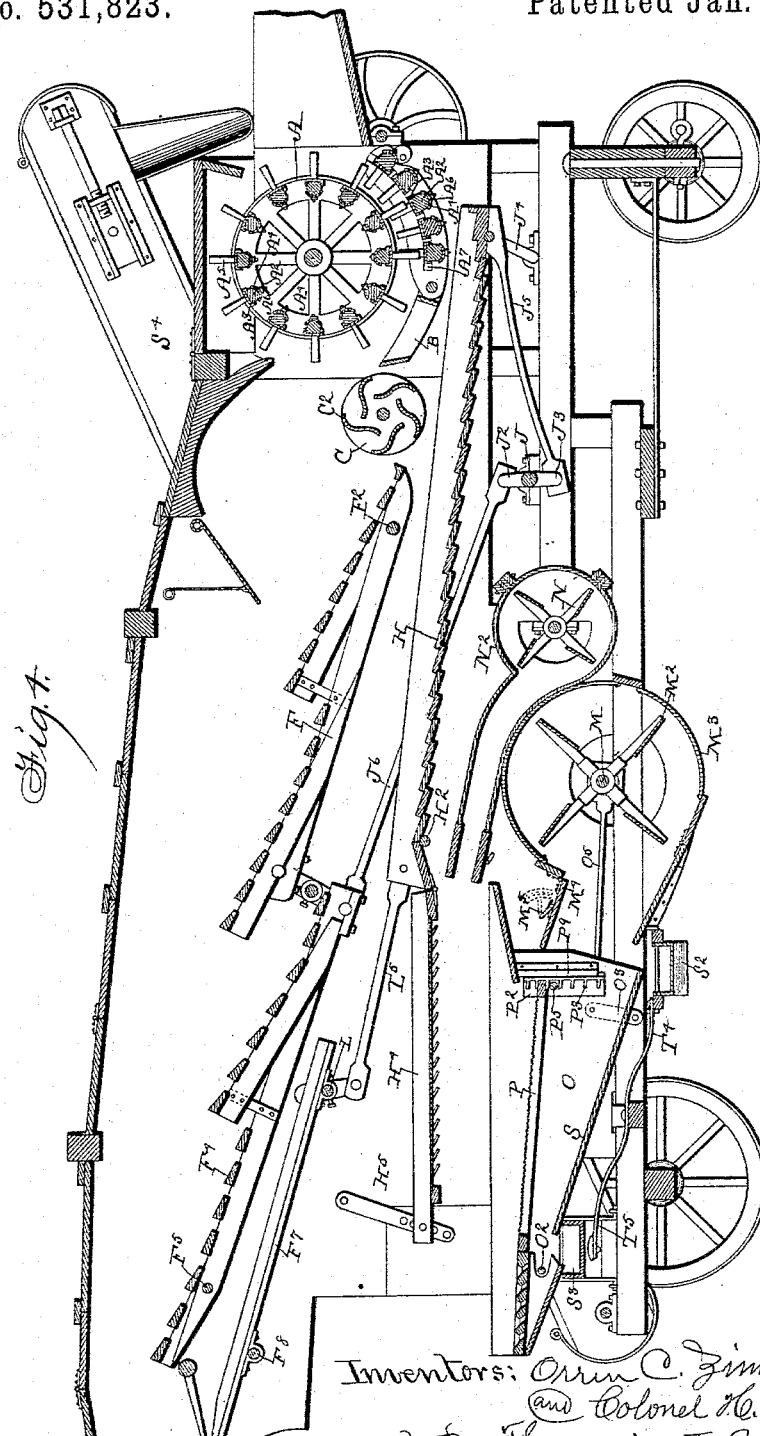

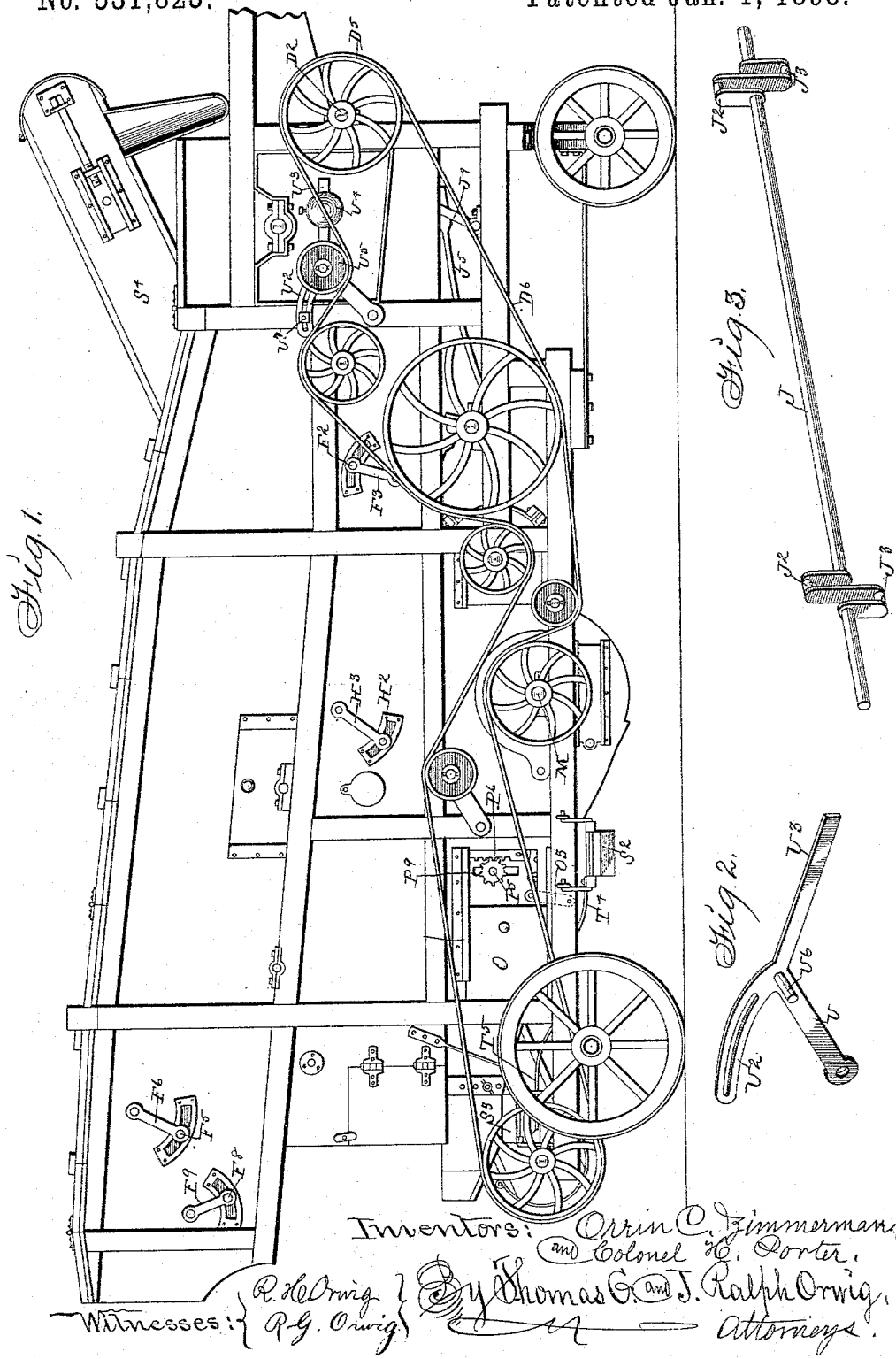

(No Model.) 4 Sheets—Sheet 3.
O. C. ZIMMERMAN & C. H. PORTER.
GRAIN THRASHER AND SEPARATOR.
No. 531,823. Patented Jan. 1, 1895.
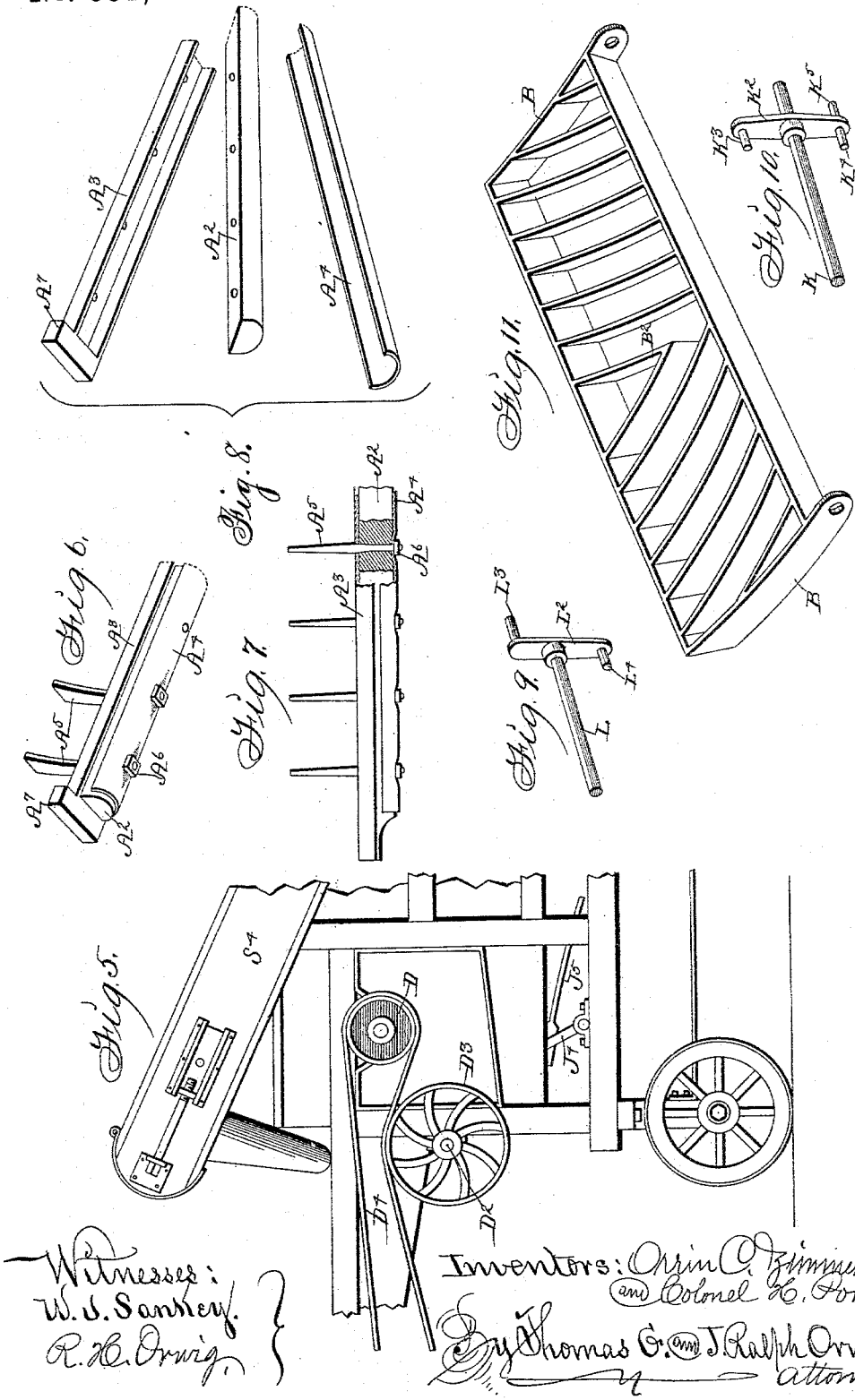

(No Model.) 4 Sheets—Sheet 4.
O. C. ZIMMERMAN & C. H. PORTER.
GRAIN THRASHER AND SEPARATOR.
No. 531,823. Patented Jan. 1, 1895.
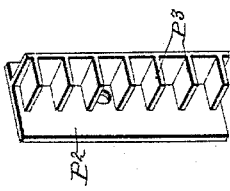
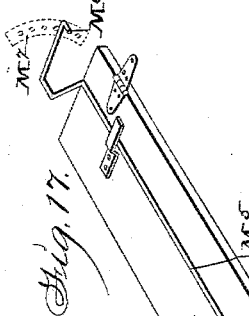
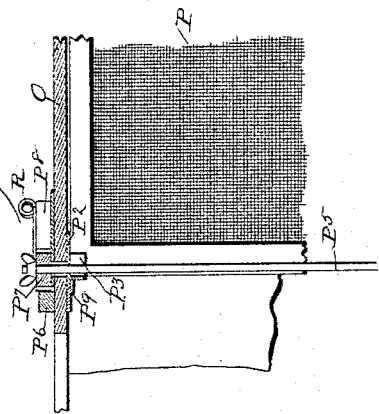
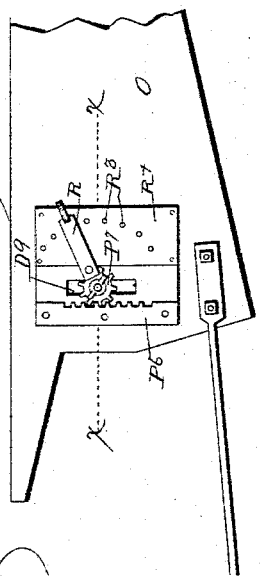
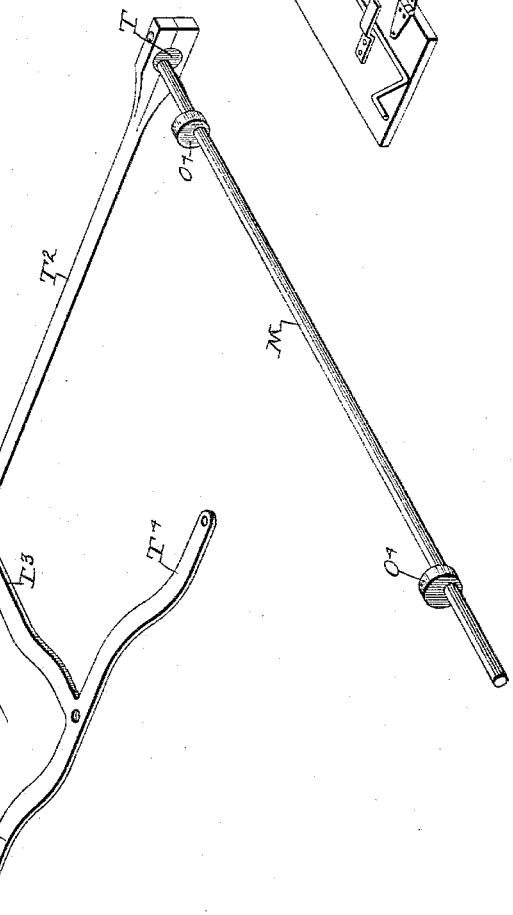
Witnesses:
W. J. Sankey.
R. H. Orwig.
Inventors: Orrin C. Zimmerman,
and Colonel H. Porter,
By Thomas G. and J. Ralph Orwig, Attorneys.

UNITED STATES PATENT OFFICE.

ORRIN C. ZIMMERMAN AND COLONEL H. PORTER, OF HAMPTON, IOWA.

GRAIN THRASHER AND SEPARATOR.

SPECIFICATION forming part of Letters Patent No. 531,823, dated January 1, 1895.

Application filed April 24, 1894. Serial No. 508,815. (No model.)

*To all whom it may concern:*

Be it known that we, ORRIN C. ZIMMERMAN and COLONEL H. PORTER, citizens of the United States, residing at Hampton, in the county of Franklin and State of Iowa, have invented certain new and useful Improvements in Grain Thrashers and Separators, of which the following is a specification.

Our object is to provide an improved grain separator that will be cheap, simple, and durable in construction and effective in operation.

Our invention consists in certain details of construction, arrangement and combination of parts as hereinafter set forth, pointed out in our claims and illustrated in the accompanying drawings, in which:—

Figure 1 is a side elevation of the complete thrasher and separator. Fig. 2 is a perspective view showing the supporting bar of the automatic belt tightener. Fig. 3 is a detail perspective view, showing the shaft from which motion is imparted to the straw racks and vibrating pans. Fig. 4 is a vertical longitudinal sectional view of the complete machine. Fig. 5 is a side elevation of the forward end portion of the machine showing the opposite side from that shown in Fig. 1, to illustrate the mechanism for imparting motion to the cylinder and the other operative mechanisms of the machine. Fig. 6 is a perspective detail view showing one end of one of the bars that form the concave and showing the two teeth in position therein. Fig. 7 is a detail view showing one of the bars of the cylinder and the method of connecting the teeth therewith. Fig. 8 is a view showing, in perspective, the three parts of which the concave bars are formed. Fig. 9 is a detail perspective view showing the end of the shaft by which motion is imparted to one of the vibrating pans. Fig. 10 is a like view showing the device by which motion is imparted to the straw carriers from the operating shaft. Fig. 11 is a detail perspective view, showing the frame that is connected with the rear end of the concave, whereby the grain and straw are distributed laterally from the center of the concave. Fig. 12 is a detail view showing a portion of the outer frame of the thrasher and the mechanism for adjusting the sieves. Fig. 13 is a sectional view through the line X—X of Fig. 12. Fig. 14 is a detail perspective view, showing one of the series of shelves upon which the sieves may be supported. Fig. 15 is a detail sectional view, through the pinion and lever that engage the rack to adjust the sieves, and also showing the device for securing said lever in position. Fig. 16 is a perspective view of the mechanism for imparting a vibratory motion to the grain and "tailings" spouts. Fig. 17 is a perspective view of the deflector for regulating the supply of air fed beneath the sieves, showing the mechanism whereby it may be readily and accurately adjusted to any desirable angle, from outside of the machine.

In a broad sense, the general construction, arrangement and operation of the thrasher and separator are of the ordinary construction and it is thought will be readily understood by persons skilled in the art, by means of a glance at the accompanying drawings, and for convenience and clearness in the following description, only those portions of the device upon which novelty is claimed, or which are essential to the understanding of the novel features thereof will be minutely described and referred to by reference symbols.

The reference letter A is used to designate the frame of the cylinder which is of the usual construction.

$A^2$ indicates one of the cylinder bars, preferably made of wood and having a rigid metal cover $A^3$, at its outer surface that partially overlaps the sides thereof and is provided with suitable openings at equal distances through which the cylinder teeth may be extended, the ends of the bars being adapted to enter suitable openings in the sides of the frame A.

$A^4$ is a segmental metal plate placed on the inner edge of the bar $A^2$ and also provided with openings arranged to coincide with the openings of the part $A^3$. This plate $A^4$ is made of either wrought or sheet metal so that when the teeth $A^5$ are extended through the bars, a nut $A^6$ placed on the inner side thereof and drawn upwardly by ordinary force will depress the metal adjacent thereto, so as to securely lock the nut in position, the resilience of the wooden bar $A^2$ and the indentation of the lower surface of the bar being sufficient to form a nut lock in itself and also prevent the wood bar from splitting.

The concave bars are constructed of three parts and have the teeth connected therewith in the same manner and in the accompanying drawings are illustrated by the same reference symbols. An angular formation $A^7$ is provided at the ends of the plate $A^3$ to project laterally from one edge thereof so as to engage the adjoining bar and maintain the proper distance or space between the concave bars.

B indicates a frame attached to the rear end of the concave and preferably segmental in outline and provided with vertical cross pieces $B^2$ that extend at an angle from the forward central portion of the frame rearwardly and outwardly therefrom so that, as the grain and straw pass between the concaves and cylinder, they will be distributed laterally so as to be spread evenly over the top surface of the straw rack and vibrating pans, as it has been found that a greater portion of the straw and grain passes through the central than the side portions of the cylinder and concave. The usual means for adjusting the concave relatively to the cylinder are provided.

C indicates a beater located in the rear of the cylinder to receive the straw and grain as it passes between the cylinder and concave and arranged to be rotated in the ordinary way. It differs from the common beater, however, in that the cross pieces or blades $C^2$ thereof, are approximately S shape in transverse section and extended from the circumference thereof inwardly tangentially, leaving a space between the blades and a hollow center in the beater. This it will be seen will prevent the grain distributed thereon from being thrown violently rearwardly as would be done by straight or radial blades and will also prevent the straw from wrapping thereupon on account of the rounded outer edges, and furthermore the beater will not create a strong rearward draft, inasmuch as the air will be enabled to pass toward the center of the device instead of being thrown straight outwardly.

D indicates a pulley fixed to one end of the cylinder shaft.

$D^2$ indicates a shaft mounted in suitable bearings extended transversely of the forward end of the machine frame and having a pulley wheel $D^3$ on one of its ends adapted to engage a belt $D^4$ passing from an engine to the pulley D, and $D^5$ is a pulley wheel on the opposite end of the shaft $D^2$ from which power is applied by means of a belt $D^6$ to all of the other operative mechanisms of the machine. By this arrangement it will be noted that, should the cylinder become stopped or checked from any cause whatsoever, the remainder of the mechanism will continue to be rotated by the belt wheel $D^3$ so as to relieve the machine from the grain and straw contained therein at the time when the cylinder becomes clogged or stopped or speed is checked so that all of the power may be applied to the cylinder in a short time.

F indicates the forward straw rack, having the shaft $F^2$ at its forward end fixed to hangers $F^3$ pivotally connected to the sides of the machine frame and capable of a movement in the segment of a circle.

$F^4$ indicates the rear rack having a shaft $F^5$ at its rear end supported by the hangers $F^6$ also pivoted to the sides of the machine frame.

$F^7$ indicates a platform located beneath the rack and having its rear end supported upon the shaft $F^8$ fixed to the hangers $F^9$ that are pivotally connected to the sides of the machine frame.

H indicates the vibrating pan, of the usual construction, placed beneath the concave beater and forward straw rack, and having its rear end supported upon the shaft $H^2$ having its ends fixed to the hangers $H^3$ which are pivotally connected to the side of the machine frame, and $H^4$ is a rack at the rear of the vibrating pan hinged thereto to operate in unison therewith and having its rear end supported by the hangers $H^5$ to which it is adjustably connected.

J indicates a shaft having two crank arms $J^2$ and $J^3$ extended in opposite directions from each end thereof and pivotally mounted in the machine frame and arranged to be driven by the belt $D^6$.

$J^4$ indicates a crank shaft mounted in suitable bearings in the machine frame and having the forward end of the vibrating pan H mounted thereon.

Motion is imparted from the crank shaft J to the vibrating pan and straw racks as follows: Two pitmen $J^5$ are connected with the crank arms $J^3$ of the shaft J and also with the crank shaft $J^4$, and two pitmen $J^6$ are connected with the crank arms $J^2$ and extending upwardly to a point between the two straw racks.

K indicates a shaft rotatably mounted in suitable bearings in the sides of the machine frame and extended transversely thereof between the rear end of the forward rack and the forward end of the rear rack, and $K^2$ is an arm fixed thereto and having a wrist pin $K^3$ at its one end pivotally connected with the forward rack, and a wrist pin $K^4$ at its opposite end pivotally connected with the rear rack, and a wrist pin $K^5$ also fixed to its lower end to which the pitman $J^6$ is connected. A like arm $K^2$ is located at each end of the shaft K and connected with the racks in the same manner. By this arrangement of parts it will be noted that when the forward rack moves rearwardly the rear rack will move forwardly, and vice versa, thus counterbalancing the vibratory motion that would be imparted to the machine frame if the racks moved in unison.

L indicates a shaft mounted in suitable bearings in the lower end of the platform $F^7$. An arm $L^2$ is fixed to each end thereof and has a wrist pin $L^3$ at its top pivotally connected with the sides of the machine frame and a wrist pin $L^4$ at its lower end connected with a pitman $L^5$ which in turn is pivoted to the rear end of the vibrating pan H. By this arrangement it will be noted that the platform $F^7$ and the vibrating pan are also moved in opposite directions at the same time, thus counterbalancing the vibratory motion which would be imparted to the machine frame if they moved simultaneously in the same direction.

M indicates a shaft rotatably mounted in suitable bearings in the machine frame and arranged to be driven by the belt $D^6$ and bearing a fan $M^2$ of the usual construction inclosed in a case $M^3$ that has an opening rearwardly to supply air beneath the sieves. A deflector $M^4$ is provided at said opening hinged at its front edge to the frame $M^3$ and supported by a rod $M^5$ pivotally and slidingly connected with its top and having its bearings in the sides of the machine frame with one of its ends extended from the frame and thence at right-angles and then inwardly at $M^6$, a segmental perforated plate $M^7$ being fixed to the side of the machine frame adapted to be engaged by the part $M^6$ whereby the incline of the deflector may be readily and accurately adjusted.

N indicates a fan similar to the fan $M^2$ arranged to be driven by the belt $D^6$ and inclosed in a casing $N^2$ which has an outlet rearwardly and upwardly above the fan $M^2$ to discharge a blast of air directly beneath the lower end of the vibrating frame and the rack $H^4$ so as to discharge a blast of air through the grain on chaffer before it reaches the sieves so that all of the chaff possible may be eliminated from the grain before it reaches the sieve, to increase the capacity of the machine.

O indicates a frame located beneath the rack $H^4$ and arranged to be vibrated as follows: $O^2$ is a bearing at the rear end of machine frame upon which the frame may readily slide, and $O^3$ are hangers pivotally connected with the sides of the machine frame and also with the sides O. $O^4$ are eccentrics fixed to the fan shaft M, and $O^5$ are pitmen connected with the said eccentrics and also with the hangers $O^3$ so that when the shaft M is rotated a vibratory motion will be imparted to the frame O.

P indicates a sieve of the usual construction adapted to be connected with the frame O so that its forward end may readily be adjusted vertically as follows: $P^2$ indicates a frame having a series of short shelves $P^3$ thereon and arranged to slide vertically in the bearings $P^9$. Each of these shelves $P^3$ is adapted to engage one of the corners of the sieve to support the same, the rear end of the sieve being supported in any suitable way. A like device $P^2$ is fixed to the other side of the frame O to support the other forward corner of the sieve. These frames are connected by means of a shaft $P^5$ extended transversely of the frame O and through the sides thereof. $P^6$ indicates a rack fixed to one side of the frame O in proximity to the end of the rod $P^5$. $P^7$ is a pinion having an integral projection $P^8$ extending radially therefrom. This rack is mounted upon the end of the rod $P^5$ and is adapted to engage the rack $P^6$, an elongated opening $D^9$ being provided in the side of the frame O adapted to allow the rod $P^5$ to have a slight vertical movement. It will now be obvious that when the projection or lever $P^8$ is moved the rack $P^7$ will engage the pinion $P^6$ and be moved in the vertical plane and carry with it the frame $P^2$ so as to adjust the forward end of the sieve. In order to secure this pinion in any desirable position we have provided a spring R fixed to the top of the projection or lever $P^8$ and having a projection $R^2$ extending downwardly therefrom through an opening in the outer end of the projection or lever $P^8$ adapted to enter any one of a series of openings $R^3$ arranged in a segmental manner upon the plate $R^4$ fixed to the side of the frame O in proximity to the opening $D^9$. By this mechanism it will be seen that the incline of the sieve may readily and accurately be adjusted by a person on the outside of the machine frame at any time whether the machine is in operation or not thereby saving much trouble and annoyance incident to the stopping of the machine when it is found that the sieves are not at the proper angle to carry the grain properly or to adapt the sieves to varying conditions or kinds of grain fed thereto, and by the arrangement of the shelves $P^3$ in the frame $P^2$ it will be noted that a large range is given in which to adjust the sieves.

S indicates an inclined board at the under side of the sieve P, and $S^2$ is a grain chute at the forward or lower end thereof, and $S^3$ is a "tailings" chute at the rear or upper end thereof leading to a conveyer $S^4$. A vibrating motion is imparted to these chutes from the shaft M by means of one pitman as follows: T indicates a cam fixed to one end of the shaft M, and $T^2$ is a pitman connected with said cam. $T^3$ is a double bell crank lever, pivotally mounted on a suitable stationary support with its one end pivotally connected with the rear end of the pitman $T^2$ and its remaining ends extended approximately longitudinally of the machine frame, the forward end $T^4$ being connected with the spout $S^2$ and the rear end $T^5$ with the spout $S^3$. The belt tightener hereinbefore referred to is adapted to be pivotally connected with the side of the machine frame to engage one of the approximately horizontally extended portions of the belt that operates the thrashing machinery and comprises a frame U, with an opening in its lower end by which the device may be connected with the machine frame, an arm $U^2$ extended rearwardly therefrom and curved in the segment of a circle that would be formed by an arc described from the pivotal point before mentioned. $U^3$ is an arm extended straight forwardly from the part U, and $U^4$ is a weight slidingly and adjustably connected with said bar. $U^5$ indicates a pulley mounted on a shaft $U^6$ extending outwardly from the upper end of the part U, and $U^7$ is a bolt passed through a slot in the arm $U^2$ and into a portion of the machine frame and having a nut on its outer end whereby the pulley may be clamped in any desirable position, if desired, and when the nut is loose the pulley be allowed a free vertical movement. The pulley $U^5$ is adapted to engage the surface of the belt, and it is obvious that tension will be applied to the belt in proportion as the weight $U^4$ is removed from the pulley.

Having thus described each separate feature, or combination of features, of the entire machine it is believed that a description of the machine as a whole, will be unnecessary, when addressed to persons familiar with thrashing machines; and

What we claim as new, and desire to secure by Letters Patent of the United States, therefore, is—

1. A bar for thrashing machine cylinders, comprising a rigid metal top portion, a wooden central portion and a yielding, metal, segmental plate on the under side thereof, and openings extended through the three parts, adapted to receive the teeth.

2. An improved cylinder for thrashing machines comprising a suitable frame rotatably mounted in the thrashing machine frame, a plurality of bars adapted to be placed in the sides of said frame and fixed therein composed of a rigid metal top piece having its sides bent inwardly, a wooden bar placed in said rigid part, and the malleable metal concave part placed on the under side of the wooden bar, openings extended through the complete bar, cylinder teeth extended through the bar and screw threaded at their inner ends, and a nut placed on the inner end of each tooth to be pressed into the malleable metal plate arranged and combined substantially as and for the purposes stated.

3. An improved concave for thrashing machines comprising a suitable frame and a plurality of concave bars adapted to be extended transversely of the machine and composed of a rigid metal top piece having formed on its end an angular projection adapted to extend laterally therefrom, a wooden bar adapted to be connected with said rigid metal bar and a malleable, metal, segmental plate fixed to the under side of the wooden bar and a plurality of teeth screw threaded at their lower ends and passed through the bar, and a nut on the lower end of each adapted to be pressed into the malleable metal plates, substantially as set forth and for the purposes stated.

4. In a thrashing machine and grain separator, a sieve adjusting device comprising two frames each having a number of shelves therein, a rod connecting the two frames and passed through the machine frame, a pinion mounted on one end of the rod, a rack fixed to the machine frame adjacent thereto, a lever formed on or fixed to said pinion, means whereby said lever may be secured in any position, and means for supporting the rear end of the sieve, substantially as and for the purposes stated.

5. In a thrashing machine the combination of a belt wheel fixed to the cylinder shaft, a shaft rotatably mounted in suitable bearings and extended transversely of the machine and having a belt wheel on each end, the one adapted to engage a belt running from a suitable source of power to the pulley on the cylinder shaft, and the other adapted to engage a belt connected with belt wheels that operate all of the other mechanisms of the thrasher, for the purposes stated.

6. In a thrashing machine a beater extended transversely of the machine frame in proximity to the cylinder, and a plurality of approximately S-shaped blades arranged tangentially therein and not in contact with each other, substantially as and for the purposes stated.

7. An improved automatic belt tightener for thrashing machines and the like comprising a bar adapted to be pivotally attached to a stationary support to move in a vertical plane and having a slotted arm extended rearwardly therefrom and curved to describe an arc from the pivotal point of the said bar, an arm extended forwardly from the said bar, a weight adjustably fixed to said arm, and a pulley rotatably mounted at the upper end of said bar, and a bolt adapted to be passed through the slotted arm and fixed to a stationary support, arranged and combined substantially as and for the purposes stated.

ORRIN C. ZIMMERMAN.
COLONEL H. PORTER.

Witnesses:
W. H. WELTY,
H. C. LIGGETT.